3,333,919
STRONTIUM RECOVERY PROCESS
John S. Buckingham, Kennewick, Wash., assignor to the
United States of America as represented by the United
States Atomic Energy Commission
No Drawing. Filed Feb. 9, 1965, Ser. No. 431,481
6 Claims. (Cl. 23—66)

ABSTRACT OF THE DISCLOSURE

A crystalline strontium carbonate precipitate is produced from a solution containing citrate anion as well as strontium ion by destroying the critrate anion prior to the addition of an alkali metal bicarbonate. The citrate anion is destroyed by adding to the solution between 5 and 10 moles of hydrogen peroxide for every mole of citrate anion and boiling the solution for several hours. After the critrate anion is destroyed, the solution is neutralized to a pH value of at least 7 and maintained at about 80° C., whereby a crystalline strontium carbonate precipitates after addition of an alkali metal bicarbonate.

---

The invention described herein was made in the course of, or under, a contract with the United States Atomic Energy Commission.

This invention deals with a process of recovering strontium values from aqueous solutions and in particular with the precipitation of said values as the carbonate.

Strontium, in particular the radioactive isotope $Sr^{90}$, occurs in waste solutions obtained in the processing of neutron-irradiated uranium. Strontium 90 is a beta-emitter and is used, for instance, in ophthalmology as a topical remedy. Customarily the strontinum is selectively extracted from such aqueous waste solutions, which are nitric acid solutions that are "contaminated" by ions other than strontium. The extractant frequently used is an organic water-immiscible solution containing di-2-ethylhexyl phosphoric acid, and back-extraction is then carried out with an aqueous solution of citric acid. Such a process is described, for instance, in the assignee's Patent No. 3,154,500 granted to George Jansen, Jr. et al. on Oct. 27, 1964.

The citric acid solution obtained in such processes may be concentrated by evaporation. The strontium is precipitated, either from the original or from the concentrated strip solution, with carbonate to convert it to a shippable compound, $SrCO_3$. This precipitation is accomplished by the addition of alkali metal bicarbonate, such as sodium or potassium bicarbonate, to an alkalinized solution.

The carbonate precipitation method has considerable drawbacks when applied to citrate-ion-containing solutions. The strontium carbonate obtained is gelatinous, and its separation from the supernatant by filtration is difficult and time-consuming. The gelatinous consistency of the strontium carbonate also results in strontium losses to the aqueous supernatant.

It has been found that the citrate anions are responsible for the gelatinous state of the strontium carbonate precipitate when present in concentrations of above about 0.2 M. It was therefore decided to destroy the citrate ion in the aqueous strip solution prior to the addition of the bicarbonate precipitating agent and thus to create a process that is free from the drawbacks listed above.

It is thus an object of this invention to provide a method for the processing of aqueous citrate-anion-containing strontium solutions for the purpose of strontium recovery in which an easily filtrable strontium carbonate precipitate is obtained.

It is another object of this invention to provide a method for the processing of citrate-anion-containing strontium solutions in which a quantitative strontium recovery is obtained.

The process of this invention comprises adding hydrogen peroxide to the aqueous citrate-anion-containing strontium solution; boiling the solution for several hours, whereby the citrate anion is destroyed; neutralizing the aqueous solution to obtain a pH value of at least 7; adding alkali metal bicarbonate; maintaining the solution at about 80° C. for about two hours, whereby a crystalline strontium carbonate precipitates; and separating the precipitate from the solution by filtration.

The neutralization of the aqueous solution can be accomplished with ammonium hydroxide, sodium hydroxide or potassium hydroxide in a preliminary step. However, the best results were obtained by neutralizing with one of the hydroxides to a pH of at least 3 and by then adding bicarbonate to complete neutralization and accomplish the precipitation. A somewhat better precipitate is obtained in this manner as compared to complete neutralization before adding the bicarbonate.

The quantity of hydrogen peroxide necessary to obtain the desirable effect of citrate anion destruction and crystallinity of the precipitated strontium carbonate is critical. It has found that at least 5 moles of hydrogen peroxide have to be present for each mole of critrate anion and that the quantity should range preferably between 5 and 10 M, as will be shown later in the example.

The alkali metal bicarbonate is advantageously added in the form of an aqueous solution and in a quantity excessive over the amount necessary for quantitative conversion of the strontium to the carbonate; and excess of about 10% over the stoichiometric amount was found very satisfactory. As has been pointed out, the quantity should also be sufficient to secure a pH value of at least 7.

In the following, an example is given to illustrate the process of this invention.

Example

A strontium solution was used containing 10 grams per liter of strontium in the form of the nitrate, citrate anion in a concentration of about 2 M and nitric acid in concentrations of 1 M and 2 M, respectively. Various quantities of a commercial 30% hydrogen peroxide solution were added to different aliquot samples of the strontium solution at boiling temperature, and boiling temperature was maintained for two hours.

Each aliquot was then neutralized to a pH value of 8 by the addition of an aqueous solution of potassium bicarbonate, and an additional amount of potassium bicarbonate was then added in a quantity to furnish a 10% excess of the stoichiometric amount necessary for strontium precipitation. The solutions were maintained at about 80° C. for approximately two hours, and the precipitates were then removed from the supernatants by filtration.

The table below contains the results of the two groups of experiments, one with solutions 1 M in nitric acid, the other one with solutions 2 M in nitric acid. The table shows the residual citric ion content of the solutions after peroxide treatment and the condition of the carbonate precipitates obtained from these solutions.

| Solution originally 1 M in $HNO_3$ | | |
|---|---|---|
| M $H_2O_2$/M Citrate | Residual Citrate Ion, M | $SrCO_3$ ppt. |
| 0 | 1.98 | Poor. |
| 4.9 | 0.48 | Poor. |
| 7.4 | 0.30 | Poor. |
| 9.9 | 0.13 | Poor. |

| Solution originally 2 M in $HNO_3$ | | |
|---|---|---|
| M $H_2O_2$/M Citrate | Residual Citrate Ion, M | $SrCO_3$ ppt. |
| 0 | 1.96 | Poor. |
| 1.0 | 1.73 | Poor. |
| 2.9 | 1.16 | Poor. |
| 4.9 | 0.69 | Fair. |
| 8.0 | 0.35 | Good. |
| 10.0 | 0.09 | Excellent. |

The above results show that fair to satisfactory results were obtained with a hydrogen peroxide quantity of five moles per one mole of citrate ion, but that excellent precipitates were obtained in both cases when the hydrogen peroxide ratio was 10.

In large-scale tests that were carried out with actual plant solutions, the situation was somewhat more favorable in that a mole ratio of five for peroxide:citrate yielded always excellent results, which means that a product was obtained that was readily filtrable.

In the tests summarized above where ratio $H_2O_2$:citrate was about 10, the strontium recovery was 99.6%.

It is well to mention here that strontium has also been precipitated heretofore from aqueous solutions with hydrogen peroxide. However, this precipitation is greatly impaired in the presence of citrate anions so that quantitative recovery is impossible.

It will be understood that the invention is not to be limited to the details given herein but that it may be modified within the scope of the appended claims.

The embodiments of the invention in which an exclusive property or privilege is claimed are defined as follows:

1. A process of recovering strontium values from aqueous nitric acid citrate-anion-containing solutions by precipitation with bicarbonate anions, comprising adding hydrogen peroxide to said aqueous solutions in a quantity to yield a molar ratio for the hydrogen peroxide:citrate anion of between 5 and 10; maintaining the solutions at boiling temperature, whereby the citrate anions are destroyed; neutralizing the solutions to a pH value of at least 7; adding alkali bicarbonate to said solutions; digesting said solutions at about 80° C. for several hours, whereby strontium precipitates as a crystalline carbonate; and removing the precipitated strontium carbonate by filtration.

2. The process of claim 1 wherein neutralization is at least partly accomplished by the addition of a hydroxide selected from the group consisting of sodium, potassium and ammonium hydroxides.

3. The process of claim 1 wherein neutralization is accomplished by the addition of alkali metal bicarbonate.

4. The process of claim 1 wherein neutralization up to a pH value of about 3 is accomplished by adding a hydroxide selected from the group consisting of sodium, potassium and ammonium hydroxides and neutralization to a pH value of at least 7 is then effected by adding alkali bicarbonate.

5. The process of claim 1 wherein the alkali metal bicarbonate is potassium bicarbonate and wherein it is added in an excess of about 10% over the amount stoichiometrically required for quantitative strontium precipitation.

6. The process of claim 1 wherein the mole ratio of hydrogen peroxide:citrate anion is about 5.

References Cited

UNITED STATES PATENTS

| | | | |
|---|---|---|---|
| 3,029,133 | 4/1962 | Goodenough | 23—66 |
| 3,154,500 | 10/1964 | Jansen et al. | 252—301.1 |
| 3,156,532 | 11/1964 | Doering et al. | 252—301.1 X |

FOREIGN PATENTS

| | | |
|---|---|---|
| 905,817 | 9/1962 | Great Britain. |

OTHER REFERENCES

Chem. Ab. vol. 56, 6179e.
Chem. Ab. vol. 56, 8049c.
Chem. Ab. vol. 56, 9705a.
Chem. Ab. vol. 56, 15105h.
Chem. Ab. vol. 58, 5039d.

OSCAR R. VERTIZ, *Primary Examiner.*

G. T. OZAKI, *Assistant Examiner.*

UNITED STATES PATENT OFFICE
CERTIFICATE OF CORRECTION

Patent No. 3,333,919                      August 1, 1967

John S. Buckingham

It is hereby certified that error appears in the above numbered patent requiring correction and that the said Letters Patent should read as corrected below.

Column 1, line 13, for "stronium" read -- strontium --; line 18, for "critrate" read -- citrate --; line 33, for "Stronium" read -- Strontium --; same column 1, line 35, for "strontinum" read -- strontium --; column 2, line 31, for "has" read -- was --; line 32, for "critrate" read -- citrate --; line 38, for "and" read -- an --; column 3, in the first table, third column, line 3 thereof, for "Poor" read -- Fair --; same table, third column, line 4 thereof, for "Poor" read -- Good --.

Signed and sealed this 29th day of October 1968.

(SEAL)
Attest:

EDWARD M. FLETCHER, JR.              EDWARD J. BRENNER
Attesting Officer                    Commissioner of Patents